United States Patent
Oberti et al.

(10) Patent No.: US 9,446,666 B2
(45) Date of Patent: Sep. 20, 2016

(54) METHOD TO SUPPLY AN ELECTRIC ACCESSORY OF A MOTOR VEHICLE COMPRISING AN ELECTRIC BATTERY TO WHICH SAID ACCESSORY IS CONNECTED

(75) Inventors: Claire Oberti, Paris (FR); Daniel Boiron, Voisins le Bretonneux (FR)

(73) Assignee: RENAULT s.a.s., Boulogne Billancourt (FR)

( * ) Notice: Subject to any disclaimer, the term of this patent is extended or adjusted under 35 U.S.C. 154(b) by 1079 days.

(21) Appl. No.: 13/495,027

(22) Filed: Jun. 13, 2012

(65) Prior Publication Data

US 2012/0319470 A1 Dec. 20, 2012

Related U.S. Application Data

(60) Provisional application No. 61/497,644, filed on Jun. 16, 2011.

(51) Int. Cl.
*B60L 1/00* (2006.01)
*B60L 11/18* (2006.01)
*H02J 7/14* (2006.01)

(52) U.S. Cl.
CPC .............. *B60L 1/00* (2013.01); *B60L 11/1809* (2013.01); *B60L 11/1861* (2013.01); *H02J 7/1438* (2013.01); *Y02T 10/705* (2013.01); *Y02T 10/7005* (2013.01); *Y02T 10/7044* (2013.01); *Y02T 10/7072* (2013.01); *Y02T 90/14* (2013.01)

(58) Field of Classification Search
CPC .. B60L 1/00; B60L 11/1809; B60L 11/1861; H02J 7/1438; Y02T 10/7005; Y02T 10/7044; Y02T 10/705; Y02T 90/14

USPC ........ 307/9.1, 10.1; 320/148, 152, 162, 164; 180/207.1, 207.3, 65.29; 701/30.5–31.1

See application file for complete search history.

(56) References Cited

U.S. PATENT DOCUMENTS

| | | | | |
|---|---|---|---|---|
| 5,595,064 A | * | 1/1997 | Ikeda et al. | ............ 62/126 |
| 6,294,843 B1 | * | 9/2001 | Kato et al. | ............ 290/40 C |
| 7,026,724 B1 | * | 4/2006 | Blackburn | ............ 307/9.1 |
| 8,030,881 B2 | * | 10/2011 | Owens et al. | ............ 320/104 |
| 8,534,400 B2 | * | 9/2013 | Stanek | ............ B60L 7/18 180/65.265 |

(Continued)

OTHER PUBLICATIONS

French Preliminary Search Report issued May 14, 2012, in French Patent Application No. 1101851, filed Jun. 16, 2011 (with English Translation of Categories of Cited Documents).

*Primary Examiner* — Carlos Amaya
*Assistant Examiner* — Aqeel Bukhari
(74) *Attorney, Agent, or Firm* — Oblon, McClelland, Maier & Neustadt, L.L.P.

(57) ABSTRACT

A method of powering an electrical accessory of a motor vehicle including an electric battery to which the accessory is connected, the accessory and the battery also being connected electrically to an external electricity generator, wherein the following steps are performed in alternation: a) causing the accessory to be powered by the battery of the vehicle; and b) causing the accessory and the battery to be powered by the external electricity generator. A motor vehicle includes an electrical accessory connected to an electric battery of the vehicle, wherein powering of the accessory is controlled by the above method when the battery is charged and connected to an external generator.

19 Claims, 3 Drawing Sheets

(56) References Cited

U.S. PATENT DOCUMENTS

| | | | |
|---|---|---|---|
| 2002/0113441 A1* | 8/2002 | Obayashi | 290/40 C |
| 2007/0012492 A1* | 1/2007 | Deng et al. | 180/65.1 |
| 2007/0152640 A1* | 7/2007 | Sasaki et al. | 320/150 |
| 2008/0074082 A1* | 3/2008 | Tae et al. | 320/136 |
| 2008/0218129 A1 | 9/2008 | Yun | |
| 2008/0271937 A1* | 11/2008 | King et al. | 180/165 |
| 2010/0019727 A1* | 1/2010 | Karden et al. | 320/129 |
| 2010/0318250 A1* | 12/2010 | Mitsutani | 701/22 |
| 2011/0095729 A1 | 4/2011 | Tsuji et al. | |
| 2011/0168462 A1* | 7/2011 | Stanek et al. | 180/65.1 |
| 2011/0175571 A1* | 7/2011 | Renken et al. | 320/112 |
| 2011/0187184 A1* | 8/2011 | Ichikawa | 307/10.1 |
| 2012/0038326 A1* | 2/2012 | Endo et al. | 320/162 |
| 2012/0086390 A1* | 4/2012 | Lim et al. | 320/107 |
| 2012/0256594 A1* | 10/2012 | Bisbing et al. | 320/134 |

* cited by examiner

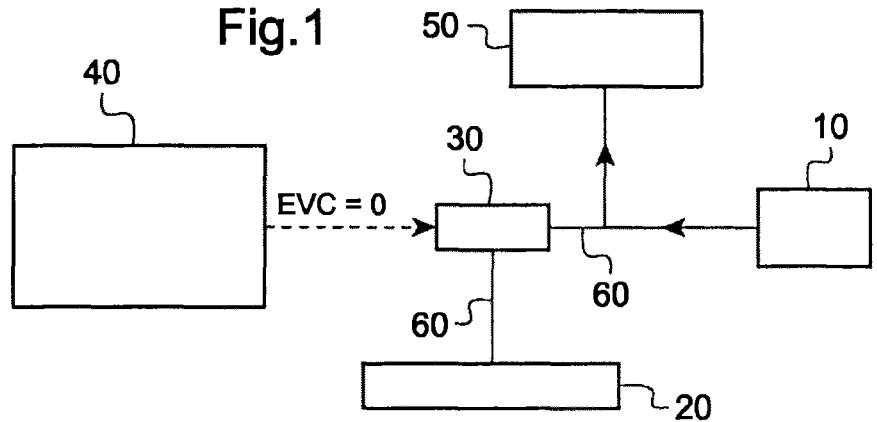
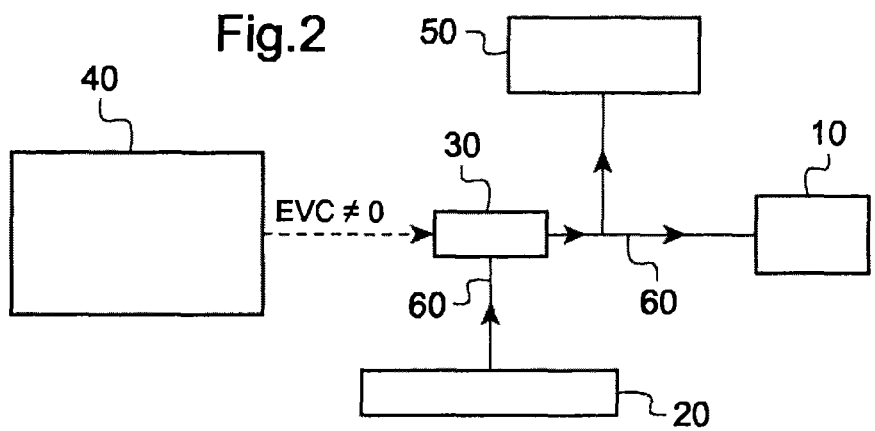
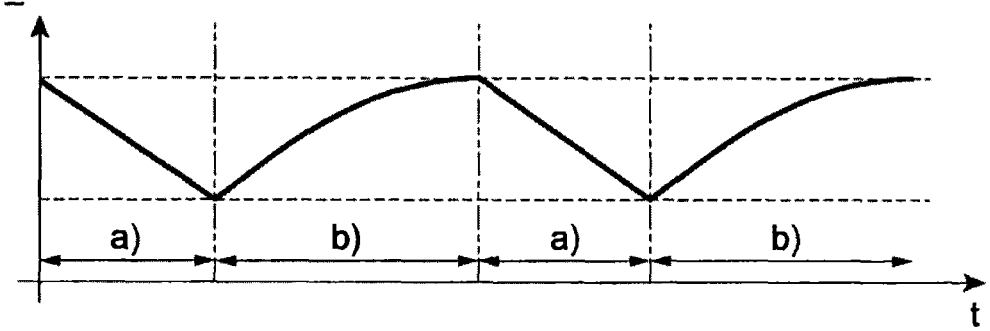

100# METHOD TO SUPPLY AN ELECTRIC ACCESSORY OF A MOTOR VEHICLE COMPRISING AN ELECTRIC BATTERY TO WHICH SAID ACCESSORY IS CONNECTED

TECHNICAL FIELD TO WHICH THE INVENTION RELATES

The present invention relates to a method of powering an electrical accessory of a motor vehicle including an electric battery to which said accessory is connected, said accessory and said battery also being connected electrically to an external electricity generator.

The invention also relates to a vehicle including an accessory that is powered by such a method.

TECHNOLOGICAL BACKGROUND

While it is being charged, the traction electric battery of an electric or hybrid motor vehicle is connected to an external electricity generator, e.g. to a standard electricity network of the "mains" type.

After charging said battery, the driver may wish to use certain accessories of the vehicle that consume electrical energy, e.g. the heating, the air-conditioning, or a car radio.

In addition, apparatus for cooling the battery can also be activated after the battery has been charged in order to optimize the performance, the charging time, and the life of the battery by limiting heating thereof.

Such accessories and such cooling apparatus are conventionally powered by the vehicle traction battery only.

That suffers from the drawback of partially discharging the freshly recharged battery, thereby decreasing the range of the vehicle the next time it is used.

OBJECT AND SUMMARY OF THE INVENTION

In order to remedy the above-mentioned drawback of the prior art, the present invention proposes a novel method of powering the electric accessories of the vehicle once battery charging is finished, making it possible to preserve the range procured by the battery of the vehicle.

More particularly, the invention provides a method as described in the introduction, wherein the following steps are performed in alternation:

a) causing said accessory to be powered by the battery of the vehicle; and b) causing said accessory and said battery to be powered by the external electricity generator.

Thus, the accessory is powered in alternation by the battery of the vehicle (step a)) and by the external generator (step b)). Simultaneously, the battery is discharged during step a), and charged during step b).

These steps can be repeated as many times as is necessary in order to power the accessory, while also periodically recharging the battery.

By means of the alternation between charging and discharging the battery, the decrease in the range of the vehicle at the time at which the driver starts the vehicle again is limited.

Other non-limiting and advantageous characteristics of the method of the invention are as follows:

the method includes the following steps:
 determining a lower threshold value for a first charge characteristic of the battery;
 performing step a) when said first charge characteristic is greater than said lower threshold value; and
 performing step b) when the first charge characteristic of the battery is less than said lower threshold value;
an initial value is determined for said first charge characteristic, and said lower threshold value is determined as a function of said initial value of said first charge characteristic;
said lower threshold value is a predetermined fixed value.

This makes it possible to limit the risks of the battery voltage dropping too low.

The decrease in the charge of the battery during step a) is then limited because that step is implemented only so long as a charge characteristic of the battery, i.e. a characteristic representative of the charge of the battery remains greater than a lower threshold value.

In a particularly advantageous implementation of the invention:

the method further includes the following steps:
 determining an upper threshold value for at least a second charge characteristic of the battery;
 performing step b) so long as said second charge characteristic of the battery is less than said upper threshold value; and
 when said second charge characteristic of the battery becomes greater than said upper threshold value, performing step a);
an initial value is determined for said second charge characteristic, and said upper threshold value is determined as a function of this second initial value for said second charge characteristic;
said upper threshold value is a predetermined fixed value.

This advantageously makes it possible to limit the risks of the battery being overcharged or of its voltage becoming too high when it is powered by the external generator at the same time as the accessory.

Other non-limiting and advantageous characteristics of the method of the invention are as follows:

the steps a) and b) are performed in alternation, going from step a) to step b) when said first charge characteristic reaches said lower threshold value, and going from step b) to step a) when the second charge characteristic reaches said upper threshold value;
said first and second charge characteristics are identical;
said first and second charge characteristics correspond to the state of charge of the battery;
said first and second charge characteristics correspond to two different physical magnitudes;
with said battery of the vehicle being made up of a plurality of storage cells, said first charge characteristic corresponds to the voltage across the terminals of the least charged cell of the battery, and said second charge characteristic corresponds to the voltage across the terminals of the most charged cell of the battery;
the first step implemented is step b);
the first step implemented is step a);
with a supervisor determining a current setpoint for the input current of the battery, said current setpoint is zero during step a);
said current setpoint is determined as a function of the maximum electric power that can be delivered by the charger and/or as a function of the maximum electric power that can be received by the battery.

The invention also provides a motor vehicle including an electrical accessory connected electrically to an electric battery of said vehicle, wherein powering of said accessory is controlled by this method when the battery is charged and connected to an external generator.

DETAILED DESCRIPTION OF AN IMPLEMENTATION

The invention and how it can be implemented can be well understood from the following description with reference to the accompanying drawings which are given by way of non-limiting example.

In the accompanying drawings:

FIG. 1 is a diagram showing the elements involved in implementing the method of the invention and the flow of electrical energy (indicated by arrows drawn in continuous lines) powering the accessories of the vehicle during step a) of the method;

FIG. 2 is a diagram showing the FIG. 1 elements and the flow of electrical energy (indicated by arrows drawn in continuous lines) powering the accessories of the vehicle during step b) of the method;

FIG. 3 shows the variation in the state-of-charge Pct_UserSoc of the battery of the vehicle, during successive implementation of the various steps of the method that are shown in FIGS. 1 and 2;

APPARATUS

Figure 4:
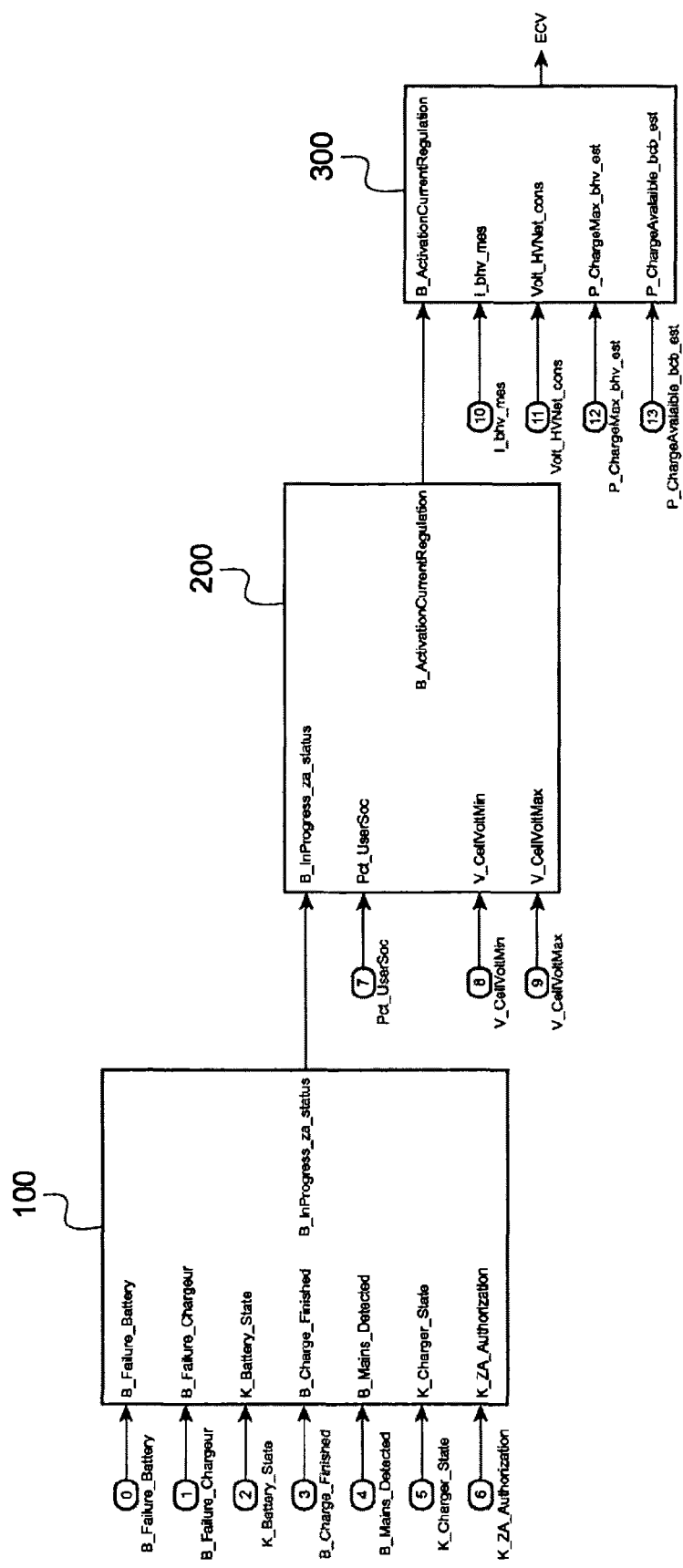
FIG. 4 is a diagram showing the functions of the electronic control unit of the vehicle as programmed for implementing the method of the invention.

FIGS. 1 and 2 show the elements of a motor vehicle (not shown) that are involved in implementing the method.

This motor vehicle is an electric or hybrid vehicle that includes a traction electric battery 10 adapted to deliver energy for causing the wheels of the vehicle to rotate.

To this end, the battery 10 powers an electric motor for driving the vehicle. In particular, the battery may be a high-voltage battery.

Said battery 10 is rechargeable and is made up of a plurality of storage cells.

Various elements of the vehicle are involved in charging the battery, in particular: a charger 30 and a supervision computer 40 for supervising charging, which computer is referred to below as the "supervisor". Said charger 30 and said supervisor 40 belong to a charging circuit 60 for charging the battery 10.

In order to be charged, the battery 10 is connected electrically to an electricity generator 20 that is distinct and independent from the battery 10, e.g. the battery is connected to the "mains". In this example, the battery 10 is connected to said generator 20 via the charger 30. Said generator 20 is external to the battery 10 and is generally external to the vehicle. For example, it is a power outlet or a charging terminal.

The battery 10 and the charger 30 are both provided with respective computers. The computers of the battery 10, of the charger 30, and of the supervisor 40 are adapted to communicate with one another. The information received by the supervisor 40 enables it to determine a battery input current setpoint adapted to charging said battery.

This current setpoint is transmitted by the supervisor 40 to the charger 30 that adapts accordingly the current coming from the generator 20 and sent to the battery 10.

As shown in FIGS. 1 and 2, an accessory 50 is connected electrically both to the battery 10 and to the electricity generator 20.

In this example, the accessory 50 is connected to the charging circuit 60 between the battery 10 and the charger 30.

For example, the accessory is constituted by the heating or by the air-conditioning of the passenger compartment, by a car radio, by the headlights of the vehicle, or indeed by a light source for lighting the passenger compartment.

It may also be constituted by an apparatus for cooling the battery that limits the rise in temperature of the battery, in particular while it is being charged or immediately after it has been charged. The battery is thus charged under optimum conditions and the speed with which the temperature of the battery comes down again after charging is accelerated, thereby enabling the driver to start the vehicle again under optimum battery operation conditions. This also improves the life of the battery 10 and its performance.

As explained in more detail below, the supervisor 40 is preferably programmed to take account of the accessory 50 of the vehicle being activated while the battery 10 is being charged, and, by means of the method of the invention, being activated at the end of charging of the battery 10. This is necessary because the accessory consumes some of the current sent by the charger 30 to the battery 10, and that consumption can interfere with charging of the battery. In addition, when the charging of the battery 10 is finished, the accessory can discharge the battery 10.

While the battery 10 is being charged, the supervisor 40 ensures that battery charging takes place in optimum manner, while also enabling said accessory 50 to be powered if necessary. Said accessory is then powered by the generator 20.

As explained in more detail below, by means of the method of the invention, the supervisor 40 ensures, at the end of battery charging, that the accessory 50 is powered while limiting discharging of the battery 10.

The vehicle also includes an electronic control unit (not shown) that is programmed to implement the method of the invention. This electronic control unit communicates with the computers of the supervisor 40, of the charger 30, and of the battery 10. It also receives the information transmitted by various sensors of the vehicle in general, and of the motor in particular.

Method

The invention relates to a method of powering the accessory of the vehicle, in which method the electronic control unit causes the following steps to be performed in alternation:

a) causing the accessory 50 to be powered by the battery 10 of the vehicle; and b) causing the accessory 50 and the battery 10 to be powered by the external electricity generator 20 connected to these two elements.

Step a) is shown diagrammatically in FIG. 1, while step b) is shown in FIG. 2. The arrows shown in these two figures indicate the flow of energy through the above-described electric circuit.

This method is applicable particularly advantageously to powering the accessory 50 after the battery 10 has been fully charged, while said battery is still connected to the generator 20 via the charger 30.

In this situation, it is particularly disadvantageous to power the accessory 50 by using the battery 10 only, because the battery discharges and the range of the vehicle when it is next started decreases.

It is also impossible to power the accessory by using the external generator only, because, since said generator is still connected to the battery, the current would also be sent to said battery, and the battery 10 might be overcharged.

By performing steps a) and b) in alternation, the accessory is powered while also limiting the discharging of the battery, because said battery is systematically recharged during step b). It is also possible to limit the risk of overcharging the battery.

It is possible to consider performing either step a) or step b) first.

When step a) is performed first, the battery 10 is firstly discharged, and then recharged by the external generator 20. After these two steps, the discharging of the battery 10 is thus limited, or indeed zero.

Implementing step b) first is advantageous because that makes it possible to compensate for the loss of charge of the battery 10 due to the phenomenon of relaxation of the battery 10.

Once the battery 10 is fully charged, the state-of-charge of said battery decreases regularly over time even when said battery is not used for powering the electric motor or the accessory 50.

This intrinsic decrease in the charge of the battery 10 is referred to as "relaxation" of the battery 10.

Recharging the battery 10 first when the accessory 50 is switched on makes it possible to compensate for the loss of charge due to the relaxation of the battery 10 since the end of charging of the battery 10.

In practice, during step a), the supervisor 40 is deactivated and, in this example, transmits a zero battery input current setpoint to the charger 30. Thus, the generator 20 does not deliver any energy either to the battery 10 or to the accessory 50 during this step, and the accessory 50 is powered by the battery 10.

During step b), the supervisor 40 transmits to the charger 30 a current setpoint that is computed in any manner known to the person skilled in the art. This setpoint is thus preferably identical to the setpoint that would be sent to the charger 30 during normal charging of the battery 10.

As explained below, this setpoint preferably takes account of the accessory being switched on, as if the accessory were switched on during normal charging of the battery.

The electronic control unit of the vehicle is programmed for implementing the method of the invention by means of three functions represented by the blocks in FIG. 4.

A first function, referred to as the "initialization" function and represented by the block 100 in FIG. 4 determines the time at which implementation of the method should start or should be interrupted.

A second function, referred to as the "activation" function and represented by the block 200 in FIG. 4, causes the supervisor 40 to be deactivated or activated, in a such a manner as to lead to a current setpoint being transmitted to the charger 30, which setpoint is zero or is determined by the supervisor 40.

A third function, referred to as the "regulation" function and represented by the block 300 in FIG. 4, is implemented by the supervisor 40 and corresponds to the current setpoint being determined by said supervisor when it is activated.

The block 100 corresponding to the initialization function emits, at its outlet, a logical signal B_InProgress_za_status which is, for example, equal to 1 if the method is to be implemented and equal to zero otherwise.

This block 100 takes, as input, the following signals transmitted by the computer of the battery 10:
- a logical signal B_Failure_Battery indicating whether an operating failure of the battery has been detected by the computer thereof;
- a signal K_Battery_State indicating the operating mode of the battery, i.e. whether or not the battery is in charge mode; and
- a logical signal B_Charge_Finished indicating whether battery charging is finished.

The block 100 takes, as input, the following signals transmitted by the computer of the charger 30:
- a logical signal B_Failure_Charger indicating whether an operating failure of the charger 30 has been detected by the computer thereof;
- a signal K_Charger_State indicating the operating mode of the charger, i.e. whether or not the charger is in charge mode; and
- a logical signal B_Mains_Detected indicating whether or not the charger 30 is connected electrically to the external generator 20.

Finally, the block 100 receives a signal K_ZA_Authorization indicating to it whether the accessory 50 is switched on and should be powered. For example, this signal may be generated by the electronic control unit of the vehicle itself.

In practice, the output signal of the block 100 is equal to 1 and indicates that the method should start or should continue to be implemented if the following conditions are satisfied simultaneously:
- the signals K_Battery_State and K_Charger_State indicate that the battery 10 and the charger 30 are both in charge mode; and
- the signal B_Charge_Finished indicates that battery charging is finished; and
- a signal B_Mains_Detected indicates that the charger 30 is connected electrically to the external generator 20; and
- the signal K_ZA_Authorization indicates that the accessory 50 is switched on and should be powered electrically.

The output signal of the block 100 is equal to zero and indicates that the method is not implemented or that implementation of the method is interrupted if:
- the logical signal B_Failure_Battery indicates that an operating failure of the battery 10 has been detected; or
- a logical signal B_Failure_Charger indicates that an operating failure of the charger 30 has been detected; or
- at least one of the signals K_Battery_State and K_Charger_ State indicates that the battery 10 or the charger 30 is not in charge mode; or
- the signal B_Charge_Finished indicates that battery charging is not finished; or
- the signal B_Mains_Detected indicates that the charger 30 is not connected electrically to the external generator 20; or
- the signal K_ZA_Authorization indicates that the accessory is not activated and should not be powered electrically.

The output signal B_InProgress_za_status of the block 100 is transmitted to the block 200 of FIG. 4.

If the output signal B_InProgress_za_status of the block 100 indicates that the method should not be implemented, the block 200 emits an output signal B_ActivationCurrentRegulation equal to zero, indicating that the battery input current setpoint is zero.

If the output signal B_InProgress_za_status of the block 100 indicates that the method should be implemented, the block 200 generates an output signal B_ActivationCurrentRegulation indicating which of the steps a) and b) of the method should be implemented.

In practice, the output signal B_ActivationCurrentRegulation of the block 200 is transmitted to the supervisor 40.

Generation of the output signal B_ActivationCurrentRegulation of the block 200 is described in more detail below.

When step a) is implemented, the signal B_ActivationCurrentRegulation deactivates the supervisor 40, and a zero setpoint is then transmitted to the charger.

When step b) is implemented, the signal B_ActivationCurrentRegulation activates the supervisor 40, and indicates that said supervisor should compute and transmit a current setpoint to the charger.

Preferably, the block 200 is programmed in such a manner that the alternation between step a) and step b) of the method is determined as a function of at least one characteristic representative of the charge of the battery, in such a manner that the battery is not discharged below a certain threshold. The corresponding loss of range of the vehicle is thus limited.

More precisely, the method of the invention then includes the following steps, which, in this example, are performed in the block 200:

the electronic control unit determines a lower threshold value for a first charge characteristic of the battery 10;

the electronic control unit performs step a) so long as said first charge characteristic remains greater than said lower threshold value; and the electronic control unit performs step b) when the first charge characteristic of the battery 10 is less than said lower threshold value.

Preferably, the electronic control unit performs step a) so long as said first charge characteristic remains strictly greater than said lower threshold value and the electronic control unit performs step b) when the first charge characteristic of the battery 10 is less than or equal to said lower threshold value.

Said lower threshold value is preferably determined as a function of an initial value of said first charge characteristic, determined at the time when the output signal of the block 100 indicates for the first time that the method should be implemented.

In a variant, said lower threshold value is a predetermined fixed value.

In addition, the electronic control unit may be programmed to perform the following steps:

determining an upper threshold value for at least a second charge characteristic of the battery 10;

performing step b) so long as said second charge characteristic of the battery 10 is less than said upper threshold value.

Preferably, the electronic control unit is programmed to perform step b) so long as said second charge characteristic of the battery 10 is strictly less than said upper threshold value.

Thus, the maximum value that the second charge characteristic of the battery 10 can reach is limited in such a manner as to avoid the battery 10 being overcharged or having its voltage become too high.

Then, when said second charge characteristic of the battery becomes greater than said upper threshold value, the electronic control unit performs step a).

Preferably, the electronic control unit performs step a) when said second charge characteristic of the battery becomes greater than or equal to said upper threshold value.

For example, said upper threshold value may be determined as a function of a second initial value for said second charge characteristic, determined at the time when the output signal of the block 100 indicates for the first time that the method should be implemented.

In a variant, said lower threshold value is a predetermined fixed value.

The electronic control unit preferably causes steps a) and b) to be performed in alternation, going from step a) to step b) when said first charge characteristic reaches the lower threshold value, and going from step b) to step a) when the second charge characteristic reaches the upper threshold value, so long as the output signal of the block 100 indicates that the method should be implemented.

The cycles of charging (step b)) and of discharging (step a) of the battery, during which cycles the state-of-charge Pct_User_Soc of the battery 10 increases and decreases, as shown in FIG. 3, are then repeated.

In practice, various manners of performing the function of activating the block 200 are possible.

Figure 5:
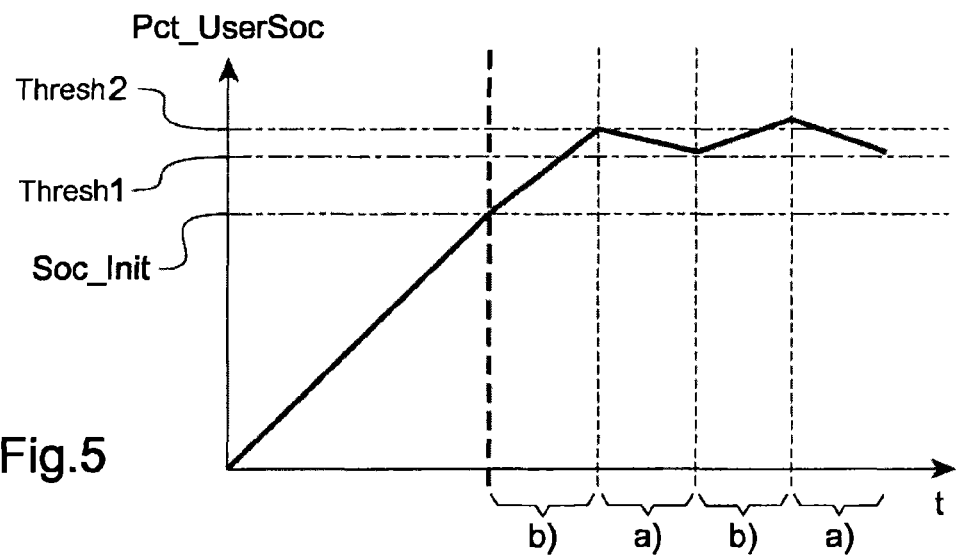
FIG. 5 is a diagram showing the variation in the state-of-charge of the battery in a first implementation.

In a first implementation shown in FIG. 5, said first and second charge characteristics are identical and correspond to the state-of-charge Pct_User_Soc of the battery 10.

The state-of-charge Pct_User_Soc of the battery 10 is expressed in conventional manner in percentage of the maximum possible state-of-charge of the battery. A maximum state-of-charge is thus equal to 100%, while a minimum state-of-charge is equal to 0%.

The state-of-charge Pct_User_Soc of the battery is estimated by the computer of the battery 10.

An initial value SOC_init of the state-of-charge Pct_User_Soc of the battery 10 is stored in memory in the electronic control unit of the vehicle at the time when the method starts to be implemented.

The electronic control unit also stores the following parameters in memory:

a maximum value Lmax for the state-of-charge Pct_User_Soc that can be reached when the method is implemented as of the end of charging of the battery; and a minimum value Lmin for the state-of-charge Pct_User_Soc that is authorized when the method is implemented as of the end of charging of the battery.

For example, said maximum value Lmax of the state-of-charge corresponds to the theoretical value of 100% that is the maximum possible charge of the battery.

Said minimum value Lmin for the state-of-charge is a value determined by tests or by calibrations making it possible to limit the loss of range of the vehicle. For example, this minimum value may be greater than 99%, in such a manner as to correspond to a loss of range of less than 1.5 kilometers. For example, it may be equal to 99.7%.

The electronic control unit also stores the following parameters in memory:

a constant Delta1 determined during a calibration step and taking account of the phenomenon of relaxation of the battery;

a constant Delta2 determined by calibration and corresponding to the authorized maximum loss of charge of the battery during implementation of the method of the invention.

Based on these stored parameters and on the estimated initial value for the state-of-charge SOC_Init, the electronic control unit is programmed to determine the lower threshold value Thresh1 and the upper threshold value Thresh2 of the state-of-charge Pct_User_Soc of the battery using the following formulae:

$$\text{Thresh1}=\text{Min}(\text{SOC\_Init}+\text{\_Delta1}-\text{Delta2}, L\text{min})$$

$$\text{Thresh2}=\text{Min}(\text{SOC\_Init}+\text{Delta1}, L\text{max})$$

where Min represents the minimum function.

The electronic control unit then, at each instant t, compares these two thresholds with a value of the state-of-charge Pct_User_Soc(t) of the battery determined at said instant.

If the initial value Soc_Init of the state-of-charge Pct_User_Soc is greater than the upper threshold value Thresh2, the output signal B_ActivationCurrentRegulation of the block 200 indicates that the supervisor 40 is deactivated and that the current setpoint is equal to zero. Thus, it is step a) that is implemented first.

If the initial value SOC_Init of the state-of-charge Pct_User_Soc is less than the lower threshold value Thresh1, the output signal B_ActivationCurrentRegulation of the block 200 indicates that the supervisor 40 is activated and a non-zero current setpoint is transmitted to the charger. The current setpoint is then generated by the block 300. It is then step b) that is implemented first.

If the initial value SOC_Init of the state-of-charge Pct_User_Soc is less than the upper threshold value Thresh2 and greater than the lower threshold value Thresh1, the electronic control unit may advantageously be programmed to perform step a) or step b) first.

Preferably, the electronic control unit is programmed to perform the step b) first.

By starting with a step of charging the battery, it is possible to compensate for the loss of charge of the battery due to the above-mentioned relaxation phenomenon. In this way, the state-of-charge of the battery at the end of implementation of the method is optimized.

Then, when the value of the state-of-charge at instant t Pct_User_Soc(t) becomes greater than or equal to the upper threshold value Thresh2, the output signal B_ActivationCurrentRegulation of the block 200 indicates that the supervisor 40 is deactivated and that the current setpoint is equal to zero in such a manner as to go over to performing step a). Thus, overcharging of the battery is avoided.

Then, when the value of the state-of-charge at instant t Pct_User_Soc(t) becomes less than or equal to the lower threshold value Thresh1, the output signal B_ActivationCurrentRegulation of the block 200 indicates that the supervisor 40 is activated and a step b) is implemented again.

The steps a) and b) are thus implemented in alternation and the value of the state-of-charge of the battery remains in the range from the minimum threshold Thresh1 to the maximum threshold Thresh2.

Figure 6:
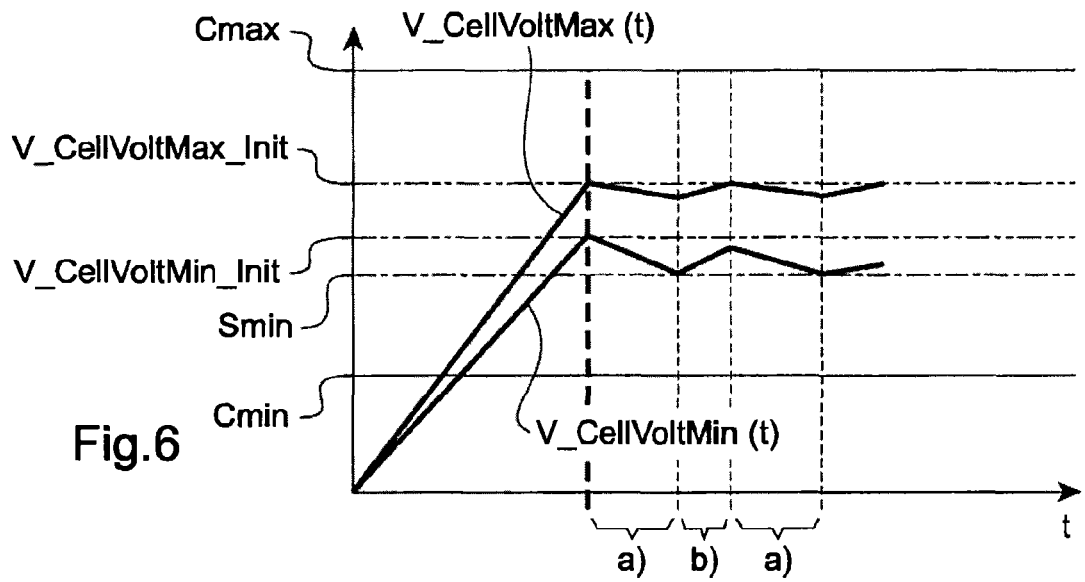
FIG. 6 is a diagram showing the variation in the voltage across the terminals of the most charged cell of the battery and across the terminals of the least charged cell of the battery, in a second implementation.

In a second implementation shown in FIG. 6, said first and second charge characteristics correspond to two different physical magnitudes.

For example, said first charge characteristic corresponds to the voltage V_CellVoltMin across the terminals of the least charged cell of the battery and said second charge characteristic corresponds to the voltage V_CellVoltMax across the terminals of the most charged cell of the battery.

These voltages are characteristics representative of the charge of the battery because they vary in the same manner as the state of charge of the battery.

An initial value V_CellVoltMin_Init, V_CellVoltMax_Init of each of the voltages V_CellVoltMin across the terminals of the least charged cell of the battery and V_CellVoltMax across the terminals of the most charged cell of the battery is stored in memory in the electronic control unit of the vehicle at the time when the method starts being implemented.

In this example, these voltages are preferably measured.

The voltage V_CellVoltMin across the terminals of the least charged cell of the battery at the instant t is the voltage across the terminals of the least charged cell at that instant, regardless of which cell it is. Similarly, the voltage V_CellVoltMin across the terminals of the most charged cell of the battery is the voltage across the terminals of the most charged cell at the instant t, regardless of which cell it is.

The electronic control unit also stores the following parameters in memory:

a maximum value Cmax for the voltage of any cell of the battery, above which there exists a risk of the voltage of the cell being too high; and a minimum value Cmin of the voltage of any cell of the battery, below which there exists a risk of the voltage of the cell being too low;

These minimum and maximum values are determined by calibration.

The electronic control unit also has in memory a constant Delta3 determined by calibration and corresponding to the authorized maximum loss of charge of the battery during implementation of the method of the invention.

On the basis of these memorized parameters and of the initial measured values of the voltages across the terminals of the most charged and of the least charged cell V_CellVoltMin_Init, V_CellVoltMax_Init, the electronic control unit is programmed to determine the lower threshold value Smin for the voltage across the terminals of the least charged cell of the battery and the upper threshold value Smax of the voltage across the terminals of the most charged cell of the battery using the following formulae:

$$S\text{min}=\text{Max}(C\text{min}, V\text{\_CellVoltMin\_Init}-\text{Delta3})$$

$$S\text{max}=\text{Min}(C\text{max}, V\text{\_CellVoltMax\_Init}),$$

where Max represents the maximum function and Min represents the minimum function.

Cmin and Cmax are safety thresholds that are not reached in nominal operation. Therefore, more simply, in nominal operation, the formulae are:

$$S\text{min}=V\text{\_CellVoltMin\_Init}-\text{Delta3}$$

$$S\text{max}=V\text{\_CellVoltMax\_Init}$$

FIG. 6 shows an example in which the voltage V_CellVoltMin_Init of the least charged cell at the start of the method is greater than the minimum threshold Cmin, and therefore Smin=V_CellVoltMin_Init−Delta3.

In this example, the voltage V_CellVoltMax_Init of the most charged cell at the start of the method is less than the maximum value Cmax, and therefore Smax=V_CellVoltMax_Init.

The electronic control unit then, at each instant t:

compares a value V_CellVoltMax(t) determined at said instant t for the voltage across the terminals of the most charged cell with the upper threshold value Smax of the voltage across the terminals of the most charged cell; and compares a value V_CellVoltMin(t) determined at said instant t for the voltage across the terminals of the least charged cell with the lower threshold value Smin of the voltage across the terminals of the least charged cell.

If the value V_CellVoltMax(t) of the voltage across the most charged cell determined at said instant t is greater than or equal to the upper threshold value Smax, the output signal B_ActivationCurrentRegulation of the block 200 indicates that the supervisor 40 is deactivated and that the current setpoint is equal to zero. Thus, battery voltage that is too high is avoided, and the accessory is powered by the battery 10, corresponding to step a) being performed.

Since, in this example, at the start of the method, the voltage V_CellVoltMax is equal to Smax, it is the step a) that is performed first in this second implementation (see FIG. 6).

During the battery-discharging step a), the voltage across the terminals of the cells decreases.

Then, when the value V_CellVoltMin(t) of the voltage across the terminals of the least charged cell at instant t becomes less than or equal to the lower threshold value Smin, the output signal B_ActivationCurrentRegulation of the block 200 indicates that the supervisor 40 is activated and a non-zero current setpoint is transmitted to the charger for performing step b).

In a variant, it is possible, in addition, to add a time condition for going from step a) to step b): the idea is to require the discharge step a) to be performed for at least some minimum duration before going over to step b). This makes it possible to avoid switching back and forth between step a) and step b) in particular during high current demands causing sudden drops in the voltage across the terminals of the cells of the battery, such as, for example, when the passenger compartment heating is switched on from cold.

Going from step a) to step b) takes place only if the above-mentioned condition is satisfied, namely if said first charge characteristic has reached the lower threshold value.

As shown in FIG. 6, during step b), the voltage across the terminals of the cells of the battery increases.

When the value of the voltage V_CellVoltMax(t) across the most charged cell at instant t becomes greater than or equal to the upper threshold value Smax, the output signal B_ActivationCurrentRegulation of the block 200 indicates that the supervisor 40 is deactivated and a non-zero current setpoint is transmitted to the charger so as to perform step a) again.

The two steps are thus performed in alternation and battery voltages that are too high or too low are avoided, while also ensuring that the charge of the battery does not decrease below a value corresponding to the charge of the battery when the voltage of the least charged cell is equal to the lower threshold value Smin.

In a variant, it is possible to make provision, in this embodiment for the electronic control unit also to have in memory a constant Delta4 determined by calibration and making it possible to compensate for the phenomenon of the battery relaxing.

The upper threshold value Smax for the voltage across the terminals of the most charged cell of the battery is then computed using the following formula:

$$Smax=Min(Cmax, V\_CellVoltMax\_Init+Delta4).$$

In nominal operation, this gives:

$$Smax=V\_CellVoltMax\_Init+Delta4$$

In addition, the electronic control unit is then programmed to perform step b) first. This variant constitutes the preferred implementation of the invention.

The alternation between the steps a) and b) then takes place in the same manner as described above.

This second embodiment offers the advantage of being based on values for the voltages of the cells that are measured rather than being estimated like the state of charge of the battery. Under these conditions, the method is implemented more accurately.

Regardless of the implementation, it is possible to consider, in a variant that the upper and lower threshold values are values that are predetermined during calibration tests.

As explained above, when the output signal B_ActivationCurrentRegulation of the block 200 is equal to zero, the supervisor 40 is deactivated and a current setpoint equal to zero is transmitted to the charger 30.

Therefore, the charger 30 does not pass any electric current from the external generator 20 towards the battery 10. Therefore, only the battery 10 powers the accessory 50.

When the output signal B_ActivationCurrentRegulation of the block 200 is equal to 1, the supervisor 40 is activated and computes the current setpoint transmitted to the charger 30, thereby performing the regulation function shown in the block 300. This setpoint is referenced ECV in FIGS. 1, 2, and 4.

This setpoint may be computed by any mode of computation known to the person skilled in the art.

In particular, the current setpoint may be computed by the supervisor 40 that is programmed to take account of the fact that the accessory receives a fraction of the current that would otherwise be going to the battery 10. Operation of this supervisor 40 is shown in FIG. 7.

Figure 7:
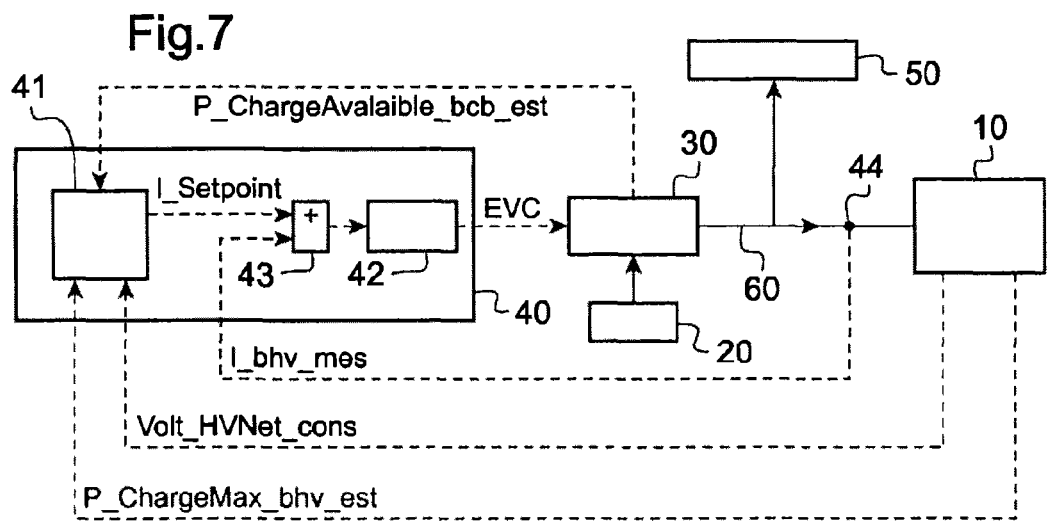
FIG. 7 is a diagram showing a possible embodiment of the supervisor 40 of FIGS. 1 and 2.

More precisely, as shown in FIG. 7, the supervisor 40 receives signals coming from the computers of the charger 30 and of the battery 10.

In particular, it receives from the battery 10:
a signal Volt_HVNet_cons indicating the voltage of the high-voltage network in the vehicle; and
a signal P_ChargeMax_bhv_est indicating the maximum charge power that the battery can receive in kilowatts.

The signal P_ChargeMax_bhv_est is also estimated by the battery computer.

For example, the signal Volt_HVNet_cons may be determined by a triangulation of three voltage measurements taken by the battery, charger, and electric motor computers.

The supervisor 40 receives from the charger 30 a signal P_ChargeAvailable_bcb_est estimated by the charger computer indicating the maximum charge power that the charger can deliver in kilowatts.

In order to adjust the charge current setpoint of the battery when the accessory 50 is switched on, in this example the supervisor 40 comprises a current setpoint generator 41, a regulator 42, and a signal subtraction block 43. The regulator is preferably of the proportional-integral type.

The supervisor 40 then performs closed-loop regulation for regulating the intensity of the current being input into the battery.

The current setpoint ECV generated by the supervisor 40 preferably depends on the maximum electric power that can be delivered by the charger and/or on the maximum electric power that can be received by the battery.

More precisely, the setpoint generator 41 receives the signals Volt_HVNet_cons, P_ChargeMax_bhv_est and P_ChargeAvailable_bcb_est, and generates an intermediate current setpoint I_Setpoint.

For example, this intermediate setpoint I_Setpoint may be computed using the following formula:

$$I\_Setpoint = Min(P\_ChargeAvailable_{bcb\_est}, P\_ChargeMax_{bhv\_est})/Volt\_HVNet\_cons.$$

The intermediate setpoint I_Setpoint determined by the setpoint generator 41 is compared by the subtractor 43 with the real magnitude I_bhv_mes of the current being input into the battery.

Said subtractor 43 receives as input said intermediate setpoint I_Setpoint and a value for the magnitude of the current at the inlet of the battery I_bhv_mes measured by a current sensor 44 disposed at the inlet of the battery, between the place where the accessory is connected to the electric circuit and the inlet of the battery.

The output signal of the subcontractor 43 then corresponds to the difference Ec between the intermediate setpoint I_Setpoint and the real value of the magnitude of the current I_bhv_mes, i.e. Ec=I_Setpoint−I_bhv_mes.

When the accessory 50 is switched on, a fraction of the current that would otherwise be going to the battery 10 is used by the accessory 50. The current I_bhv_mes measured at the inlet of the battery 10 decreases.

The current setpoint ECV computed by the regulator 41 is then corrected to take account of the difference Ec between the intermediate setpoint I_Setpoint and the measured current I_bhv_mes, in order to compensate for the effect that the accessory 50 being switched on has on the charge current charging the battery 10. The setpoint for the current being input into the battery then also depends on the difference Ec between the intermediate setpoint I_Setpoint and the measured current I_bhv_mes.

Thus, the accessory 50 is powered, and the battery 10 is charged in optimum manner.

For example, the regulator 42 used may be a corrector of the proportional-integral type, having a proportion gain factor and an integral gain factor as its parameters. Such a corrector advantageously includes anti-windup apparatus, i.e. anti-saturation apparatus that makes it possible to take account of the saturations in generating the setpoint ECV.

The proportional gain and integral gain factors are determined by calibration on the basis of the transfer function of the charger 30 in open-loop mode.

For example, the proportional gain is determined as being the maximum gain procuring a phase margin of 45° on the Bode diagram of said transfer function.

For example, the integral gain may be determined by requiring that the frequency of the integral action is a frequency equal to one decade below the frequency at which the phase is equal to 135° in open-loop mode. In a degraded mode, it is possible to consider making provision for the alternation between the two steps a) and b) to be predetermined, e.g. by defining set durations for implementation of each step. The invention also relates to the motor vehicle including the electric battery 10 and the electrical accessory 50 connected to said battery, in which vehicle powering of said accessory 50 is controlled by the above-described method. This method is preferably implemented once the battery 10 is charged, i.e. after the end of charging of the battery has been detected, and while the battery 10 is still connected to the external generator 20.

The method of the invention offers the following advantages:

- it is applicable regardless of the conditions for triggering or for interrupting charging of the battery, i.e. regardless of the state-of-charge, the nominal charge, the charge programmer, and the charge retarder, for example;
- it is applicable regardless of the conditions for triggering or for interrupting implementation of the method, i.e., for example, the method is implemented immediately after the end of charging or several hours thereafter;
- the method may be implemented by a conventional supervisor, with the same current regulation as is usually used during charging of the battery;
- the setting parameters are few and easy to adjust;
- it is applicable to any type of battery, charger, or current sensor.

In particular, the method may be implemented even if the current sensor 44 measuring the input current of the battery 10 is of low accuracy, i.e. accurate to within plus or minus 3 amps.

The invention claimed is:

1. A method of powering an electrical accessory of a motor vehicle including an electric battery to which said accessory is connected, comprising:
   determining simultaneously whether an electric battery is fully charged, whether the motor vehicle is connected electrically to an external electricity generator, and whether an accessory of the vehicle is switched on;
   when the electric battery is fully charged, when the motor vehicle is connected electrically to the external electricity generator, and when the accessory of the vehicle is switched on simultaneously, determining a lower threshold characteristic value for a first charge characteristic of the battery;
   performing the following steps in alternation while the vehicle is connected to the external electricity generator:
   a) powering said accessory by the battery of the vehicle without being powered by the external electricity generator when said first charge characteristic is greater than said lower threshold value; and
   b) powering said accessory and said battery by the external electricity generator, the external electricity generator being external to the motor vehicle when the first charge characteristic of the battery is less than said lower threshold value; and stopping the performing of step a) and step b) when the accessory is deactivated.

2. The method according to claim 1, wherein an initial value is determined for said first charge characteristic, and said lower threshold value is determined as a function of said initial value of said first charge characteristic.

3. The method according to claim 1, wherein said lower threshold value is a predetermined fixed value.

4. The method according to claim 1, wherein:
   an upper threshold value is determined for at least a second charge characteristic of the battery;
   step b) is performed so long as said second charge characteristic of the battery is less than said upper threshold value.

5. The method according to claim 4, wherein:
   when said second charge characteristic of the battery becomes greater than said upper threshold value, step a) is performed.

6. The method according to claim 4, wherein an initial value is determined for said second charge characteristic, and said upper threshold value is determined as a function of this second initial value for said second charge characteristic.

7. The method according to claim 4, wherein said upper threshold value is a predetermined fixed value.

8. The method according to claim 4, wherein the steps a) and b) are performed in alternation, going from step a) to step b) when said first charge characteristic reaches said lower threshold value, and going from step b) to step a) when the second charge characteristic reaches said upper threshold value.

9. The method according to claim 4, wherein said first and second charge characteristics are identical.

10. The method according to claim 8, wherein said first and second charge characteristics correspond to the state of charge of the battery.

11. The method according to claim 4, wherein said first and second charge characteristics correspond to two different physical magnitudes.

12. The method according to claim 11, wherein, with said battery of the vehicle being made up of a plurality of storage cells, said first charge characteristic corresponds to a voltage across terminals of a least charged cell of the battery, and said second charge characteristic corresponds to a voltage across terminals of a most charged cell of the battery.

13. The method according to claim 1, wherein:
step a) is performed for at least a predetermined minimum duration.

14. The method according to claim 1, wherein the first step implemented is step b).

15. The method according to claim 1, wherein the first step implemented is step a).

16. The method according to claim 1, wherein, with a supervisor determining a current setpoint for the input current of the battery, said current setpoint is zero during step a).

17. The method according to claim 16, wherein said current setpoint is determined as a function of the maximum electric power that can be delivered by the charger and/or as a function of the maximum electric power that can be received by the battery.

18. A motor vehicle, comprising:
an electric battery including a computer configured to output a first signal indicating whether the electric battery is fully charged, a second signal indicating whether the motor vehicle is connected electrically to an external electricity generator, and a third signal indicating whether an electrical accessory of the vehicle is switched on;
the electrical accessory connected to the electric battery of said vehicle; and
a controller configured to receive the first, second, and third signals from the electric battery, configured to determine a lower threshold characteristic value for a first charge characteristic of the batter, when the first signal indicates that the electric battery is fully charged, when the second signal indicates that the motor vehicle is connected electrically to the external electricity generator, and when the third signal indicates that the electrical accessory of the vehicle is switched on simultaneously, and configured to control powering of said accessory while the vehicle is connected to the external electricity generator by
powering said accessory by the electric battery of the vehicle without being powered by the external electricity generator when said first charge characteristic is greater than said lower threshold value, and
powering said accessory and said electric battery by the external electricity generator,
when the electric battery is charged and connected to an external generator that is external to the motor vehicle when the first charge characteristic of the electric battery is less than said lower threshold value,
wherein the controller is configured to stop the control of the powering of the accessory when the accessory is deactivated.

19. The method according to claim 1, wherein the lower threshold value for the first charge characteristic of the battery is greater than 99% of a maximum possible charge for the battery.

* * * * *